United States Patent [19]

Vanderveen

[11] 4,204,831
[45] May 27, 1980

[54] FUEL BURNER USEFUL FOR CARBON BLACK PRODUCTION

[75] Inventor: John W. Vanderveen, Bartlesville, Okla.

[73] Assignee: Phillips Petroleum Company, Bartlesville, Okla.

[21] Appl. No.: 893,378

[22] Filed: Apr. 4, 1978

[51] Int. Cl.² ............................ F23M 3/04; C09C 1/50
[52] U.S. Cl. ...................................... 431/10; 431/158; 431/351; 422/156; 423/456
[58] Field of Search ...................... 431/8, 10, 158, 173, 431/351, 182, 185; 60/39.65; 422/156, 150, 151; 423/456, 457, 458

[56]  References Cited
U.S. PATENT DOCUMENTS

| | | | |
|---|---|---|---|
| 2,659,201 | 11/1953 | Krejci | 60/39.65 |
| 3,677,532 | 7/1972 | Wolfersperger | 431/9 X |
| 3,721,529 | 3/1973 | Kraus | 422/156 |
| 4,046,864 | 9/1977 | Cheng | 423/456 |
| 4,127,387 | 11/1978 | Vanderveen et al. | 422/158 |

Primary Examiner—Carroll B. Dority, Jr.
Assistant Examiner—Lee E. Barrett

[57] ABSTRACT

A burner apparatus comprising in axial alignment a cylindrical first section connected through a restrictive opening to a frustoconical second section having its largest diameter at the downstream end and an axial outlet opening at the downstream end. Tangential combustion supporting gas inlets aligned in the same rotational direction are located in the cylindrical section and at the downstream end of the frustoconical section. The outlet opening in the frustoconical second section is of greater diameter than the restrictive opening between the sections and is of lesser diameter than the upstream end of the frustoconical second section so that a stable flame is produced in the second section, there is an inflow of external gas through the outlet opening, and a flow of combustion supporting gas in an upstream direction along the wall of the second section. A method for burning fuel in combustion supporting gas, particularly adapted to produce carbon black, is also provided.

7 Claims, 2 Drawing Figures

FUEL BURNER USEFUL FOR CARBON BLACK PRODUCTION

BACKGROUND OF THE INVENTION

This invention relates to an apparatus and method for burning fuel in combustion supporting gas. In one of its aspects this invention relates to an apparatus and method for producing a stable flame in a combustion apparatus. In another of its aspects this invention relates to an apparatus and method for burning fuel in combustion supporting gas in which the wall of a second chamber is protected from the flame and is cooled by an induced backflow of external gas and combustion supporting gas along the wall of the second section. In yet another aspect of the invention a method and apparatus particularly suited as a source of hot combustion gases for the production of furnace carbon black is provided.

Although a very large number of configurations in the design of equipment for burning fuel in a combustion supporting gas are known, a burner apparatus capable of producing a stable flame and hot combustion gases at various feed rates and at the same time maintaining a cool wall surface in the combustion chamber and the combustion chamber outlet is an important advancement in the art. Such an apparatus is presented in this disclosure.

It is an object of this invention to provide an apparatus and method for burning fuel in combustion supporting gas in which a stable flame is maintained at various feed rates. It is also an object of this invention to provide an apparatus and method for burning fuel in combustion supporting gas while protecting the wall and outlet port of the combustion chamber from the intense heat produced in the hot combustion gases. It is another object of the invention to provide a burner useful as an efficient burner for home heating and building heating furnaces. It is still another object of the invention to provide a burner useful in the production of hot combustion gases for production of furnace carbon black.

Other aspects, objects, and the various advantages of this invention will become apparent upon reading this specification taken in conjunction with the drawing and the appended claims.

STATEMENT OF THE INVENTION

According to the invention, a burner apparatus is provided in which a cylindrical first section adapted with axial fuel inlet and at least one tangential combustion supporting gas inlet is axially aligned through a restrictive opening to a frustoconical second section downstream of the first section and having the largest diameter at the downstream end with at least one tangential combustion supporting gas inlet located in the downstream portion so that the combustion supporting gas charged to the frustoconical section has the same rotational direction as that in the cylindrical section, and equipped with an axially aligned outlet opening from the downstream end of the second section. The outlet opening is required to have a greater diameter than the restrictive opening between the cylindrical section and the frustoconical section and is also required to have a lesser diameter than the upstream end of the frustoconical section.

In a further embodiment of the invention, the burner apparatus described above has, in addition, a frustoconical third section aligned axially downstream of the frustoconical second section with this third section also having its largest diameter at the downstream end with at least one tangential combustion supporting gas inlet located in the downstream portion located so that the rotational direction of the combustion supporting gas charged thereto is the same as in the two prior sections and with an axially aligned outlet opening from its downstream end subject to the restrictions that the outlet is of greater diameter than the diameter of the outlet of the frustoconical second section and of lesser diameter than the upstream end of the frustoconical third section.

In another embodiment of the invention, a method for burning fuel in combustion supporting gas is provided in which fuel and combustion supporting gas are passed through an apparatus of either two or three chambers as described above so that a stable flame is produced in the combustion section, there is an inflow of external gas through the outlet opening, and a flow of combustion supporting gas is induced in an upstream direction along the wall of the second section and the third section. This method for burning fuel to produce hot combustion gases which are useful in the production of furnace carbon black, can be described as passing fuel axially and passing combustion supporting gas tangentially into a cylindrical first section of a burner apparatus thereby providing a first combustion mixture. Passing the first combustion mixture from the first section axially through a restrictive opening into a frustoconical second section of the burner to provide a flame in the second section while combustion supporting gas passed tangentially into the enlarged downstream end of the second section in the same rotational direction as in the first section creates a flow of combustion supporting gas along the wall of the frustoconical section toward the upstream end of that section thereby protecting the side wall from heat and from the flame. The combustion mixture is then passed axially from the second section through an outlet opening that is sized to create both the upstream flow of tangential combustion supporting gas in the second section and an inflow of external gas through the outlet opening thereby protecting the outlet opening and the side walls of the burner from the heat of the hot combustion gases and the heat of the flame. Where applicable, the hot combustion gas from the second section is passed axially into a frustoconical third section of the burner while additional combustion supporting gas is passed tangentially into the enlarged downstream end of the third section in the same rotational direction as in the other two sections to create a flow of combustion supporting gas along the wall of the section toward the upstream end thereby, also, protecting the wall of this section from the hot combustion gases. When the third section is used, hot combustion gas is passed axially through an outlet opening sized to create both the flow of combustion supporting gas along the wall of the third section and to produce an inflow of external gas across the lips of the outlet opening. This invention provides a very efficient, economical burner adapted to burn any fuel gas or liquid fuel and is even adapted to burn powdered solid fuel such as powdered coal, coke, and mixtures of these fuels. The burner is useful in manufacturing processes where high temperature gases are used, such as in furnace carbon black manufacture, cracking of hydrocarbons, and the like. The burner is also useful as an efficient burner for home and building furnaces.

The configuration of the second section allows a high temperature stable flame from the restrictive opening with minimal wall contact of the flame in the second section. In usual operation the flame does not touch any surface other than the restrictive opening in the second section. The secondary combustion supporting gas, e.g., air, flowing tangentially into the second section surrounds the flame and there is an inflow of cooler external gases, e.g., air, along the cylindrical surface of the outlet from the second section which keeps this portion of the burner relatively "cool".

The invention can best be understood in conjunction with the drawing in which

Figure 1:
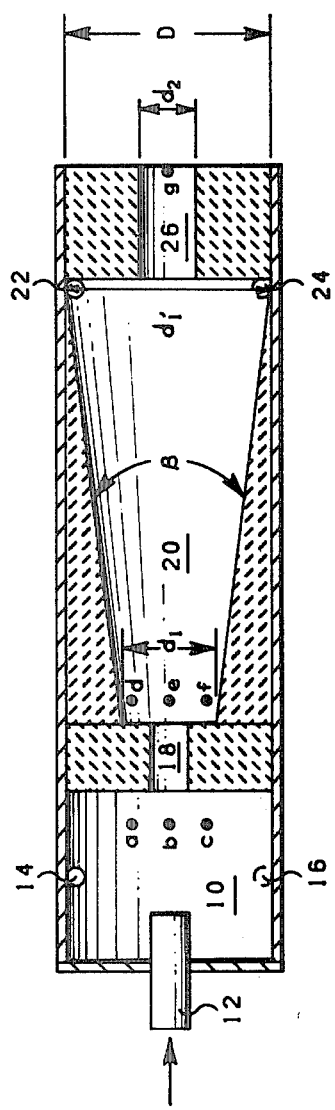
FIG. 1 is a side view elevation of a burner of the present design.

Referring now to FIG. 1, fuel is admitted into cylindrical section 10 through axial inlet line 12 while combustion supporting gas, such as air, is tangentially admitted into this section through inlet lines 14, 16. The fuel and combustion supporting gas mix and are passed through restrictive opening 18 to produce a flame in frustoconical section 20.

Secondary combustion supporting gas, such as air, enter frustoconical second section 20 through tangential ports 22, 24 which provide rotational flow in the same direction as the combustion supporting gases which are introduced into the cylindrical first section. The sizing of the outlet 26 from the frustoconical second section induces both a flow of external air inwardly across the throat surface of the outlet opening 26 and an upstream flow of combustion supporting gases along the wall of the frustoconical second section 20 to provide cooling of these surfaces.

The dimensional relationships of the various parts of this apparatus which allow operation for the cooling of the wall are, taking the greatest internal diameter of an operating section as D: a total length of the apparatus from about 2D to about 10D; the length of the cylindrical first section 10 from about 0.5D to about D; the length of the restrictive opening 18 into the frustoconical second section from about 0.5D to about 2D; the diameter of this restrictive opening 18 from about 0.06D to about 0.25D; the length of the frustoconical second section 20 from about 1.5D to about 4D; with an upstream diameter $d_1$ of the second section 20 from about 0.25D to about 0.75D and with a downstream diameter $d_1'$ of the frustoconical second section greater than 0.25D to about D; and the diameter of the outlet 26 or $d_2$ from the frustoconical second section from less than about 0.25D to about 0.5D. The critical restriction requires that the outlet 26 or $d_2$ from the frustoconical second section must be smaller than the upstream diameter $d_1$ of the frustoconical section 20 to insure backflow of cooler gases along the wall surfaces.

Figure 2:
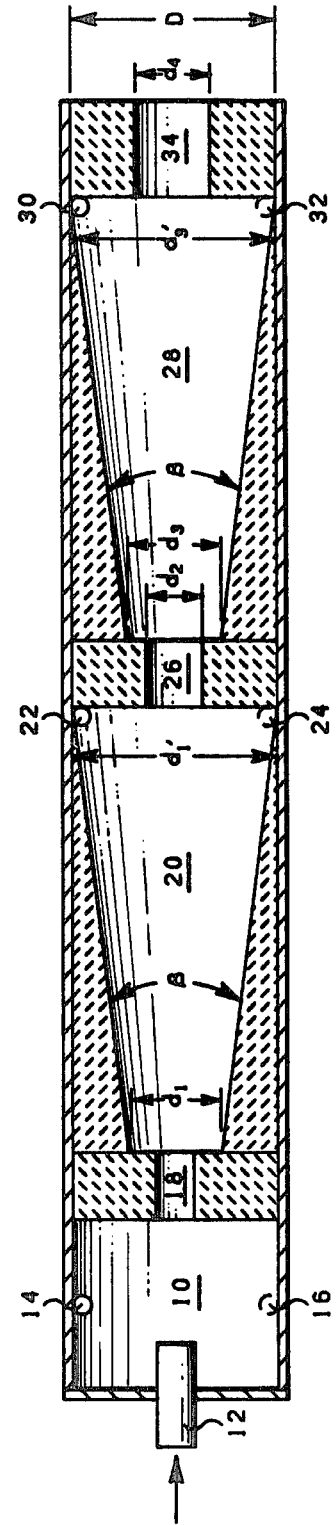
FIG. 2 is a side view elevation of a burner of a further embodiment in which there are two frustoconical sections.

When a device such as described in FIG. 2 is used, the flow through the first two sections is the same as described above with a mixture of combustion gases exiting the frustoconical second section through outlet 26 being delivered into frustoconical third section 28. This section, like the other frustoconical section, has a tangential flow of combustion supporting gas through inlets 30, 32 in the same rotational direction as in the prior sections. The outlet opening 34 from the frustoconical third section is sized so that external air is induced to flow into the frustoconical third section across the lips of outlet 34 and the combustion supporting gas introduced through inlets 30, 32 is induced to flow upstream along the wall of the section thereby cooling the section walls.

Using the dimension D, as above, the dimensions of the frustoconical third section are: length of 28 from about 1.5D to about 4D; upstream diameter of 28 or $d_3$ from about 0.35D to about 0.85D; downstream diameter $d_3'$ from greater than about 0.35D to about 0.95D; and the outlet 34 or $d_4$ of the frustoconical third section having a diameter of about 0.3D to about 0.8D.

The critical relationship of dimensions of an apparatus as shown in FIG. 2 requires that the diameter of the upstream end of the frustoconical second section be greater than the diameter of the outlet opening from the frustoconical second section and that the upstream diameter of the frustoconical third section be greater than the diameter of the outlet opening of the frustoconical third section which in turn must be greater than the diameter of the outlet of the frustoconical second section. These dimensions are illustrated in FIG. 2, and can be stated as $d_1 > d_2$; $d_3 > d_4 > d_2$; $d_1' > d_1$; and $d_3' > d_3$.

The diverging angle of the frustoconical second and, where applicable, third sections of the apparatus of this invention can be any angle that gives an increase in diameter from the upstream end toward the downstream end of these sections. Preferably the diverging angle $\beta$ is in the range of about 4 degrees to about 20 degrees, most preferably in the range of about 8 degrees to about 15 degrees.

In actual operation, using an apparatus as illustrated in FIG. 1 made from Resco Cast AA22 ceramics, the apparatus had the following dimensions:

| | |
|---|---|
| Diameter of Shell, inches | 4 |
| Total Length, inches, | 16 |
| Primary Zone (10): | |
| Diameter, inches, | 4 |
| Length, inches, | 3 |
| Primary Wall (containing 18): | |
| Diameter, inches, | 4 |
| Thickness, inches, | 1 |
| Primary Orifice 18 Diameter, inches, | ½ |
| Secondary Zone (20): | |
| Upstream Diameter, inches | 2 |
| Downstream Diameter, inches, | 4 |
| Length, inches, | 10 |
| Total Diverging Angle, $\beta$, | 11° |
| Secondary Wall (containing 26): | |
| Diameter, inches, | 4 |
| Thickness, inches, | 2 |
| Secondary Orifice 26 Diameter, inches, | 1 |
| Fuel and Air inlets, Diameter, inches, | ½ |

All streams were added at 80° F. with air used as combustion supporting gas at a pressure of about 36 psig and methane used as fuel at a pressure of about 13.5 psig. Methane was added to inlet 12 at 0.280 scf/min., primary tangential air through inlets 14, 16 at 2.80 scf/min., and secondary tangential air through inlets 22, 24 at 1.72 scf/min. The primary air was 100% of the stoichiometric amount for complete combustion. The temperatures in degrees F. measured for points a-g as illustrated in FIG. 1 were as follows:

Temperatures, °F.

(a) 998
(b) 1810
(c) 2461
(d) 1205

(e) 2785
(f) 1363
(g) 1313

Temperature measuring points a, b, and c were one-half inch upstream from the upstream face of the primary wall (containing orifice 18); b was on the axial centerline of the apparatus; a and c were one-fourth inch radially outward from the centerline. Temperature measuring points d, e, and f were one-half inch downstream from the downstream face of the primary wall; e was on the axial centerline of the apparatus; d and f were one-fourth inch radially outward from the centerline. Temperature measuring point g was on the axial centerline and at the downstream outlet of orifice 26 which orifice is in the secondary wall. These temperatures illustrate the cooling effect demonstrated by the use of the apparatus of this invention.

I claim:
1. A burner apparatus comprising
   (a) a cylindrical first section adapted with axial fuel inlet and at least one tangential combustion supporting gas inlet;
   (b) a frustoconical second section aligned axially downstream of said first section and having the largest diameter at the downstream end with at least one tangential combustion supporting gas inlet located in the downstream portion, said combustion supporting gas inlet of the same rotational relationship as in the cylindrical section;
   (c) means forming an axially aligned restrictive opening between said first and second sections; and
   (d) a member blocking the largest diameter portion of said frustroconical second section, said member having a planar surface in juxtaposition with the downstream end of said second section, an axially aligned outlet opening in said member beginning at said planar surface, said outlet of greater diameter than said restrictive opening and of lesser diameter than the upstream end of said second section.

2. A burner apparatus of claim 1 wherein said restrictive opening is sized within the diameter of about 0.06D to about 0.25D and said outlet opening is sized within the diameter of about 0.25D to about 0.5D, where D is the greatest internal diameter of the burner shell.

3. A burner apparatus of claim 2 wherein the diameter of the second section ranges from greater than 0.25D at the upstream end to about D at the downstream end and the length of said second section is in the range of about 1.5D to about 4D.

4. A burner apparatus of claim 3 wherein the total diverging angle of the second section is in the range of about 4 degrees to about 20 degrees.

5. A burner apparatus comprising in addition to the apparatus of claim 1:
   (e) a frustoconical third section aligned axially downstream of said second section and having the largest diameter at the downstream end with at least one tangential combustion supporting gas inlet located in the downstream portion, said combustion supporting gas inlet of the same rotational relationship as in the cylindrical section;
   (f) means forming an axially aligned outlet opening from the downstream end of said third section, said outlet of greater diameter than said outlet from the second section and of lesser diameter than the upstream end of said third section.

6. A method for burning fuel in combustion supporting gas comprising:
   (a) passing fuel axially and passing combustion supporting gas tangentially into a cylindrical first section of a burner apparatus to provide a first combustion mixture;
   (b) passing said first combustion mixture from said first section axially through a restrictive opening into a frustoconical second section of the burner apparatus to provide a flame in said second section;
   (c) passing combustion supporting gas tangentially into the enlarged downstream end of said second section in the same rotational direction as in said first section; and
   (d) passing said combustion mixture axially from said second section through a restricted outlet opening in a member blocking the enlarged downstream end of said second section.

7. A method of claim 6 wherein said fuel is chosen from among gaseous fuels, liquid fuels, and powdered solid fuels chosen from among coal and coke and mixtures of these fuels.

* * * * *